(12) United States Patent
Zhang et al.

(10) Patent No.: US 11,761,185 B2
(45) Date of Patent: Sep. 19, 2023

(54) TWO-HANDLE AUTOMATIC FAUCET

(71) Applicant: Xiamen Forbetter Sanitary Ware Co., Ltd., Fujian (CN)

(72) Inventors: Xingui Zhang, Xiamen (CN); Yihui Chen, Xiamen (CN); Mouyong Lin, Xiamen (CN)

(*) Notice: Subject to any disclaimer, the term of this patent is extended or adjusted under 35 U.S.C. 154(b) by 59 days.

(21) Appl. No.: 17/504,521

(22) Filed: Oct. 19, 2021

(65) Prior Publication Data

US 2023/0117016 A1    Apr. 20, 2023

(51) Int. Cl.
*E03C 1/05* (2006.01)
*F16K 11/00* (2006.01)

(52) U.S. Cl.
CPC .......... *E03C 1/057* (2013.01); *F16K 19/006* (2013.01)

(58) Field of Classification Search
CPC ......... E03C 1/055; E03C 1/057; F16K 19/006
See application file for complete search history.

(56) References Cited

U.S. PATENT DOCUMENTS

| | | | | |
|---|---|---|---|---|
| 5,549,273 | A * | 8/1996 | Aharon | E03C 1/057 251/30.05 |
| 8,438,672 | B2 * | 5/2013 | Reeder | E03D 9/04 4/668 |
| 2007/0246550 | A1 * | 10/2007 | Rodenbeck | G05D 23/1353 236/12.11 |
| 2009/0056011 | A1 * | 3/2009 | Wolf | E03C 1/057 4/623 |
| 2013/0167953 | A1 * | 7/2013 | Kuroishi | E03C 1/055 137/560 |

* cited by examiner

*Primary Examiner* — Janie M Loeppke

(57) ABSTRACT

A two-handle automatic faucet includes a faucet body, a solenoid valve core, a controller, and a sensor. The solenoid valve core, the controller and the sensor are mounted to the faucet body. The controller is electrically connected to the solenoid valve core and the sensor. The controller controls action of the solenoid valve core according to a sensor signal of the sensor, so as to correspondingly control water flow of the two-handle automatic faucet. The controller and the solenoid valve core are installed to the faucet body, thus, it is convenient for a user to install the finished product of the two-handle automatic faucet.

8 Claims, 11 Drawing Sheets

TWO-HANDLE AUTOMATIC FAUCET

BACKGROUND OF THE INVENTION

1. Field of the Invention

The present invention relates to a kitchen faucet, and more particularly to a two-handle automatic faucet.

2. Description of the Prior Art

Most of the existing two-handle faucets use mechanical cold water valve cores and hot water valve cores to control cold and hot water channels, respectively. Therefore, the user needs to control both the cold water valve core and the hot water valve core for adjusting water temperature and controlling water flow of the two-handle faucet. This is relatively inconvenient in operation.

For this reason, dual-handle automatic faucets are developed on the market, as disclosed in Chinese Patent Publication No. CN213508711U and Chinese Patent Publication No. CN203847774U. The flow of water is still controlled by a cold water valve core and a hot water valve core. It is more convenient to control the flow of water through a sensor control. However, the solenoid valve core and the controller of the existing two-handle automatic faucet for controlling water flow are installed on a control box. The control box and the main body of the two-handle automatic faucet are independent of each other. In this way, users who purchase the products of the existing two-handle automatic faucets need to install the control box having the solenoid valve core and the controller in addition to installing the main body of the two-handle automatic faucet. This is more troublesome for installation.

SUMMARY OF THE INVENTION

The primary object of the present invention is to provide an easy-to-install two-handle automatic faucet.

In order to achieve the above object, the present invention adopts the following solutions.

A two-handle automatic faucet comprises a faucet body, a solenoid valve core, a controller, and a sensor. The faucet body includes a base, a cold water valve core, a hot water valve core, and a faucet spout. The base has a cold water channel, a hot water channel, and a water output channel communicating with the cold water channel and the hot water channel. The cold water valve core and the hot water valve core are mounted to the base. The faucet spout is matched with the base. The faucet spout has a nozzle communicating with the water output channel. The solenoid valve core, the controller and the sensor are installed to the faucet body. The controller is electrically connected to the solenoid valve core and the sensor. The controller controls action of the solenoid valve core according to a sensor signal of the sensor, so as to correspondingly control water flow of the nozzle of the faucet spout.

Preferably, the base includes a mounting seat, a cold water valve seat, and a hot water valve seat. The mounting seat has the cold water channel, the hot water channel, and the water output channel. The cold water valve seat and the hot water valve seat are connected to the mounting seat. An inner cavity of the cold water valve seat and an inner cavity of the hot water valve seat communicate with the cold water channel and the hot water channel, respectively. The cold water valve core and the hot water valve core are mounted to the cold water valve seat and the hot water valve seat, respectively.

Preferably, the mounting seat is provided with a water passage. The cold water channel and the hot water channel communicate with the water output channel through the water passage. The water passage is provided with a cold water inlet, a hot water inlet and a water outlet communicating with the cold water channel, the hot water channel and the water output channel, respectively. The solenoid valve core is installed to the mounting seat of the base. A valve head of the solenoid valve core extends into the water passage and movably blocks the water outlet.

Preferably, the solenoid valve core is provided with a partition. The partition extends into the water passage and partitions an inner cavity of the water passage into a water flow chamber and an air flow chamber. The cold water inlet, the hot water inlet and the water outlet communicate with the water flow chamber. The valve head of the solenoid valve core extends into the water flow chamber. The solenoid valve core has a ventilation channel communicating with the air flow chamber. The mounting seat has a water output port for connecting the nozzle. The water output port is in communication with the water output channel. The air flow chamber communicates with the water output port through an air flow channel in the mounting seat.

Preferably, the faucet spout includes an outer pipe, an inner pipe, and the nozzle. The inner pipe is inserted into the outer pipe. One end of the inner pipe is connected to the nozzle. Another end of the inner pipe is connected to a connecting joint. The connecting joint is connected to the mounting seat. The connecting joint communicates with the water output port.

Preferably, the outer pipe includes a fixed pipe and a movable pipe. One end of the fixed pipe is mounted to the base. The movable pipe is rotatably connected to another end of the fixed pipe.

Preferably, the mounting seat of the base has a mounting groove. The controller is installed in the mounting groove.

Preferably, the base further includes a fixing seat. The fixing seat includes two fixing sleeves and a fixing plate connected to the two fixing sleeves. The two fixing sleeves of the fixing seat are sleeved onto the cold water valve seat and the hot water valve seat, respectively. The fixing plate of the fixing seat supports the mounting seat.

Preferably, the sensor is installed to the nozzle. The sensor has two sensor probes. A sensing direction of one of the sensor probes is along a water jetting direction of the nozzle. A sensing direction of the other sensor probe is along a side of the nozzle.

Preferably, the two-handle automatic faucet further comprises a power supply battery electrically connected to the controller. The power supply battery is installed to a battery holder. The battery holder includes an elastic clamp.

Preferably, the battery holder has a slot.

After adopting the above solution, the present invention has the following features:

1. The solenoid valve core and the controller of the present invention are installed to the faucet body. In this way, there is no need for the users who purchase the products of the two-handle automatic faucet provided by the present invention to install a control box having the solenoid valve core and the controller while installing the two-handle automatic faucet. Therefore, it is convenient for the user to install the finished product of the two-handle automatic faucet provided by the present invention.

2. The sensor of the present invention has two sensor probes, so that the present invention can realize two different control modes for controlling the faucet to jet water. It is convenient for users to use.

DETAILED DESCRIPTION OF THE PREFERRED EMBODIMENTS

Figure 1:
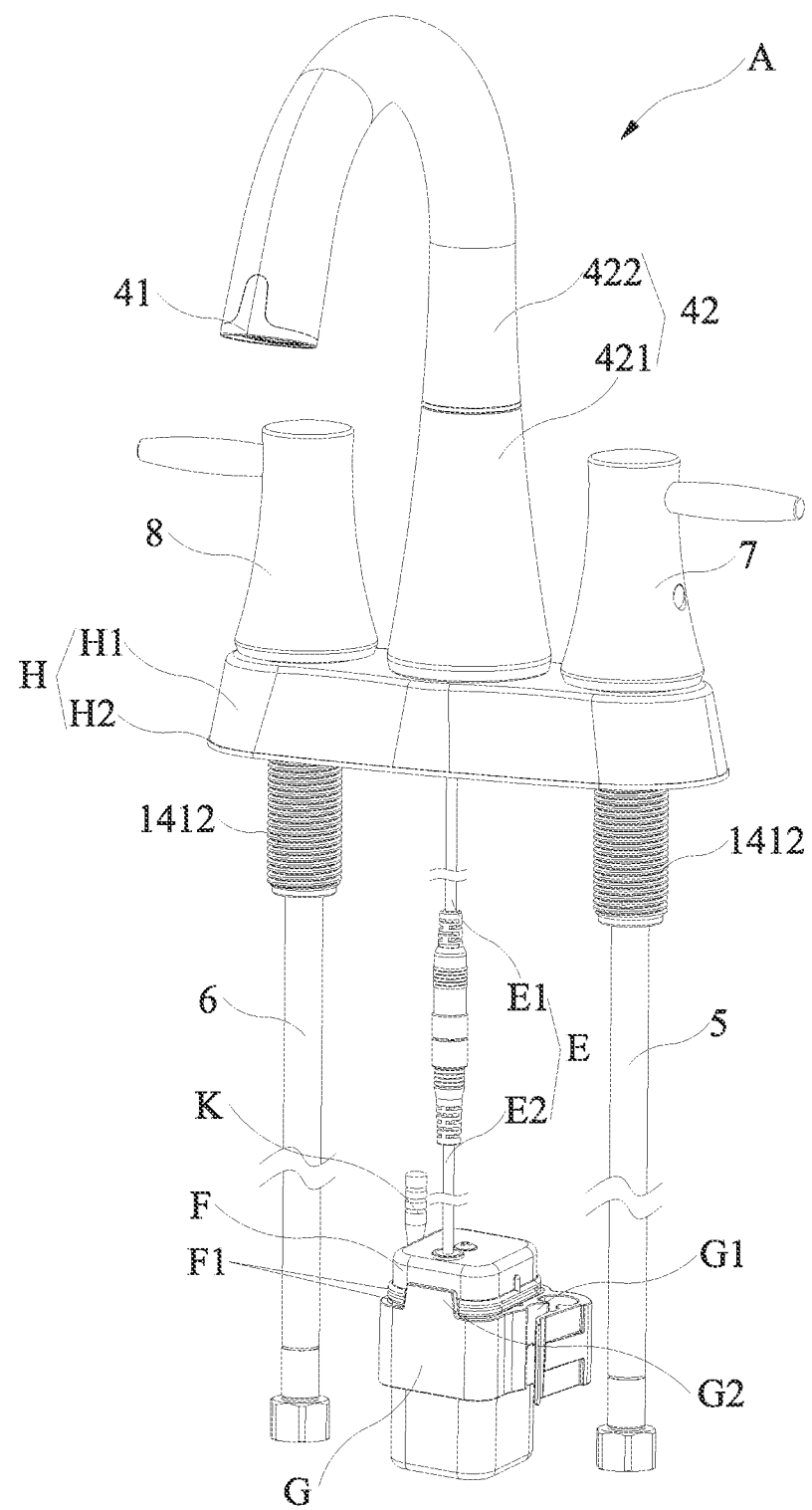
FIG. 1 is a first perspective view of the present invention.
Figure 2:
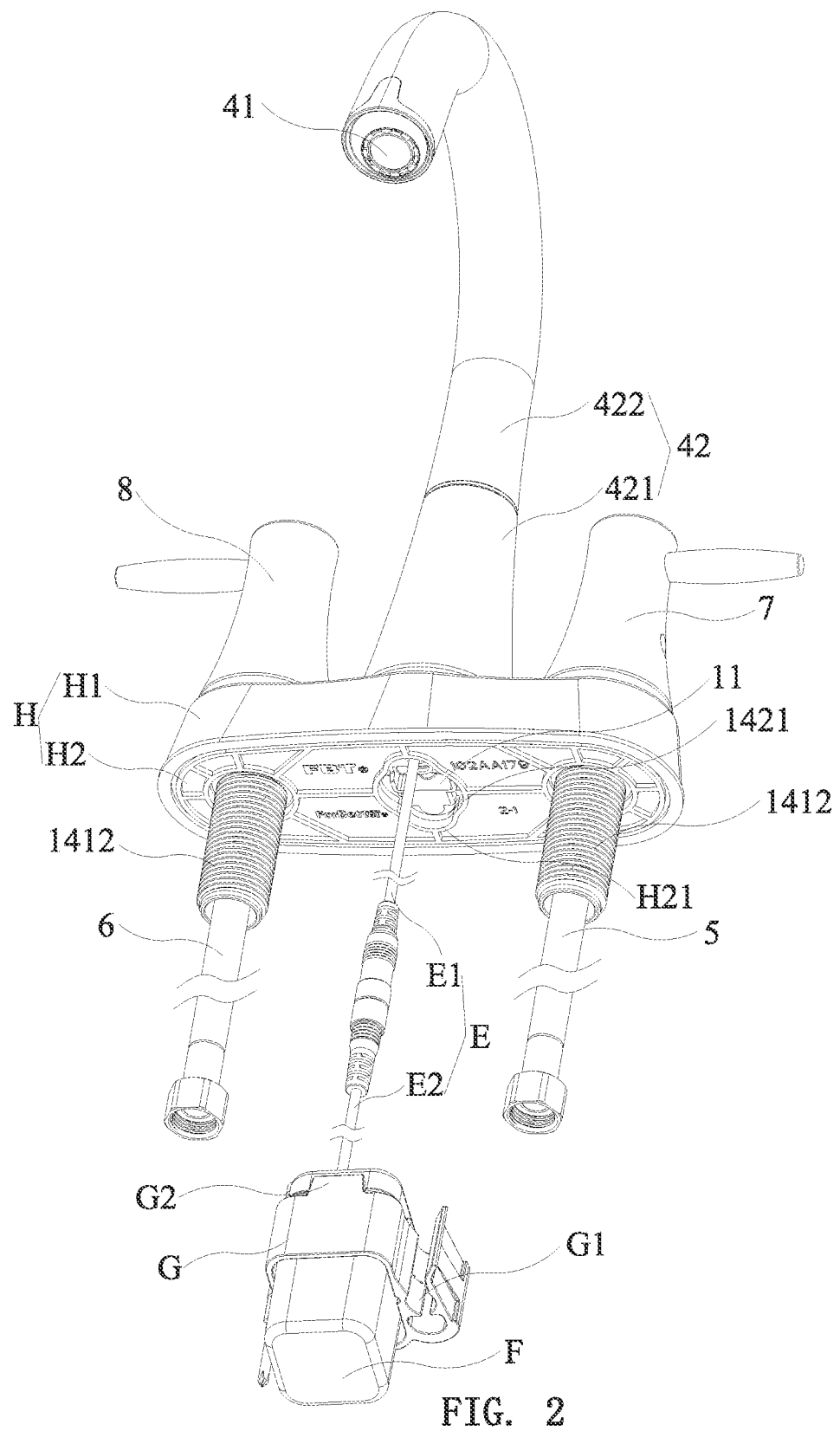
FIG. 2 is a second perspective view of the present invention.

Embodiments of the present invention will now be described, by way of example only, with reference to the accompanying drawings.

Referring to FIG. 1 through FIG. 13, the present invention discloses a two-handle automatic faucet, comprising a faucet body A, a solenoid valve core B, a controller C, and a sensor D. The controller C controls the action of the solenoid valve core B according to the sensor signal of the sensor D, so as to correspondingly control water flow of the two-handle automatic faucet A.

As shown in FIGS. 1 to 8, the faucet body A includes a base 1, a cold water valve core 2, a hot water valve core 3, and a faucet spout 4. The base 1 has a cold water channel 111, a hot water channel 112, and a water output channel 113 communicating with the cold water channel 111 and the hot water channel 112. The cold water valve core 12 and the hot water valve core 13 are mounted to the base 1. The faucet spout 4 is matched with the base 1. The faucet spout 4 has a nozzle 41 communicating with the water output channel 113. The cold water valve core 2 and the hot water valve core 3 are configured to respectively control the cold water channel 111 and the hot water channel 112 to be in communication with external water sources (cold water source and hot water source), thereby controlling the flow and temperature of water flowing out from the nozzle 41.

As shown in FIGS. 3 to 8, the base 1 may include a mounting seat 11, a cold water valve seat 12, and a hot water valve seat 13. In this way, the parts of the base 1 may be formed separately, which is beneficial to manufacture the base 1 conveniently. The mounting seat 11 has the cold water channel 111, the hot water channel 112, and the water output channel 113. The cold water valve seat 12 and the hot water valve seat 13 are connected to the mounting seat 11. The inner cavity of the cold water valve seat 12 and the inner cavity of the hot water valve seat 13 communicate with the cold water channel 111 and the hot water channel 112, respectively. The cold water valve core 2 and the hot water valve core 3 are mounted to the cold water valve seat 12 and the hot water valve seat 13, respectively. As shown in FIG. 3, FIG. 4, FIG. 7 and FIG. 8, the cold water valve seat 12 is provided with a cold water outlet joint 121 and a cold water inlet joint 122. The cold water outlet joint 121 and the cold water inlet joint 122 communicate with the inner cavity of the cold water valve seat 12. The cold water outlet joint 121 is configured to deliver water to the cold water channel 111. The cold water inlet joint 122 is configured to connect a cold water supply pipe 5 to an external water source (cold water source). The cold water valve core 2 controls the flow area between the cold water outlet joint 121 and the cold water inlet joint 122. The hot water valve seat 13 is provided with a hot water outlet joint 131 and a hot water inlet joint 132. The hot water outlet joint 131 and the hot water inlet joint 132 communicate with the inner cavity of the hot water valve seat 13. The hot water outlet joint 131 is configured to deliver water to the hot water channel 112. The hot water inlet joint 132 is configured to connect a hot water supply pipe 6 to an external water source (hot water source). The hot water valve core 3 controls the flow area between the hot water outlet joint 131 and the hot water inlet joint 132. The mounting seat 11 has a cold water port 114 and a hot water port 115 that are connected to the cold water outlet joint 121 and the hot water outlet joint 131, respectively. The cold water port 114 and the hot water port 115 are in communication with the cold water channel 111 and the hot water channel 112, respectively.

As shown in FIG. 3, FIG. 4, FIG. 7 and FIG. 11, the cold water port 114 includes a cold water port connecting portion. The cold water port connecting portion includes a cold water port slide groove 1141 that is disposed on the inner wall of the cold water port 114 and is arranged axially along the cold water port 114, a cold water port circumferential hole 1142 that penetrates through the side wall of the cold water port 114 and extends in the circumferential direction of the cold water port 114, and a cold water port axial hole 1143 that penetrates through the side wall of the cold water port 114 and is arranged axially along the cold water port 114. The two ends of the cold water port circumferential hole 1142 communicate with the cold water port slide groove 1141 and the cold water port axial hole 1143, respectively. The cold water outlet joint 121 is provided with a cold water joint engaging block 1211 to be mated with the cold water port connecting portion. The cold water joint engaging block 1211 is first inserted into the cold water port slide groove 1141 of the cold water port connecting portion, and then slides along the cold water port circumferential hole 1142 into the cold water port axial hole 1143 and is locked in place with the cold water port axial hole 1143, thereby connecting the cold water outlet joint 121 and the cold water port 114. In this way, the cold water outlet joint 121 and the cold water port 114 can be easily connected.

As shown in FIG. 3, FIG. 4, FIG. 7 and FIG. 12, the hot water port 115 includes a hot water port connecting portion. The hot water port connecting portion includes a hot water port slide groove 1151 that is disposed on the inner wall of the hot water port 115 and is arranged axially along the hot water port 115, a hot water port circumferential hole 1152 that penetrates through the side wall of the hot water port 115 and extends in the circumferential direction of the hot water port 115, and a cold water port axial hole 1153 that penetrates through the side wall of the hot water port 115 and is arranged axially along the hot water port 115. The two ends of the hot water port circumferential hole 1152 communicate with the hot water port slide groove 1151 and the hot water port axial hole 1153, respectively. The hot water outlet joint 131 is provided with a hot water joint engaging block 1311 to be mated with the hot water port connecting portion. The hot water joint engaging block 1311 is first inserted into the hot water port slide groove 1151 of the hot water port connecting portion, and then slides along the hot water port circumferential hole 1152 into the hot water port axial hole 1153 and is locked in place with the hot water port axial hole 1153, thereby connecting the hot water outlet joint 131 and the hot water port 115. In this way, the hot water outlet joint 131 and the hot water port 115 can be easily connected.

As shown in FIGS. 3 to 8, the base 1 further includes a fixing seat 14. The fixing seat 14 includes two fixing sleeves 141 and a fixing plate 142 connected to the two fixing sleeves 141. The two fixing sleeves 141 of the fixing seat 14 are sleeved onto the cold water valve seat 12 and the hot water valve seat 13, respectively. The fixing plate 142 of the fixing seat 14 supports the mounting seat 11. The two fixing sleeves 141 of the fixing seat 14 are respectively sleeved onto the cold water valve seat 12 and the hot water valve seat 13 to confine the cold water valve seat 12 and the hot water valve seat 13, so that the cold water valve seat 12 and the hot water valve seat 13 are firmly connected to the mounting seat 11. The two fixing sleeves 141 each have a notch 1411 for the cold water outlet joint 121 of the cold water valve seat 12 and the hot water outlet joint 131 of the hot water valve seat 13 to pass therethrough. The cold water valve core 2 and the hot water valve core 3 are inserted into the cold water valve seat 12 and the hot water valve seat 13, respectively. The two fixing sleeves 141 of the fixing seat 14 are connected with a cold water valve cover 15 and a hot water valve cover 16, respectively. The cold water valve cover 15 and the hot water valve cover 16 respectively press the cold water valve core 2 and the hot water valve core 3 to confine the cold water valve core 2 and the hot water valve core 3 within the cold water valve seat 12 and the hot water valve seat 13, respectively. The cold water valve cover 15 and the hot water valve cover 16 are respectively connected to the fixing sleeves 141 through screw threads or by a snap-fit connection. A cold water valve core rod 21 of the cold water valve core 2 is connected with a cold water control handle 7 for operating the cold water valve core 2. A hot water valve core rod 31 of the hot water valve core 3 is connected with a hot water control handle 8 for operating the hot water valve core 3. Each of the two fixing sleeves 141 of the fixing seat 14 is provided with an external threaded pipe section 1412, so that the fixing seat 14 can be locked on the three-hole countertop by nuts matched with the fixing sleeves 141, and then the faucet body A is installed to the three-hole countertop.

As shown in FIGS. 3 to 8, the base 1 further includes a cover plate 17 installed on the fixing plate 142 of the fixing seat 14. The cover plate 17 is locked to the fixing plate 142 by screws. The mounting seat 11 is clamped by the cover plate 17 and the fixing plate 142 to secure the mounting seat 11 on the fixing seat 14 firmly.

As shown in FIGS. 3 to 8, the faucet spout 4 may include an outer pipe 42, an inner pipe 43, and the nozzle 41. The inner pipe 43 is inserted into the outer pipe 42. One end of the inner pipe 43 is connected to the nozzle 41, and the other end of the inner pipe 43 is connected to a connecting joint 44. The connecting joint 44 is connected to the mounting seat 11, so that the water output channel 113 is connected to the nozzle 41 through the inner pipe 43. The outer pipe 42 may include a fixed pipe 421 and a movable pipe 422. One end of the fixed pipe 421 is mounted to the base 1. The movable pipe 43 is rotatably connected to the other end of the fixed pipe 421. In this way, the user can turn the movable pipe 43 to adjust the direction of the nozzle 41. The fixed pipe 421 is locked to the cover plate 17 of the base 1 through a connecting seat 45. The cover plate 17 has a through hole 171 corresponding to the fixed pipe 421. The connecting seat 45 and the fixed pipe 421 are threadedly connected, and the connecting seat 45 and the fixed pipe 421 clamp the circumference of the through hole 171.

As shown in FIGS. 3 to 8, the solenoid valve core B, the controller C and the sensor D are installed to the faucet body A. The controller C is electrically connected to the solenoid valve core B and the sensor D. The controller C controls the action of the solenoid valve core B according to the sensor signal of the sensor D, so as to correspondingly control the water flow of the nozzle 41 of the faucet spout 4. The solenoid valve core B and the controller C are installed to the faucet body A. In this way, there is no need for the users who purchase the products of the two-handle automatic faucet provided by the present invention to install the control box having the solenoid valve core B and the controller C while installing the two-handle automatic faucet. Therefore, it is convenient for the user to install the finished product of the two-handle automatic faucet provided by the present invention.

Figure 4:
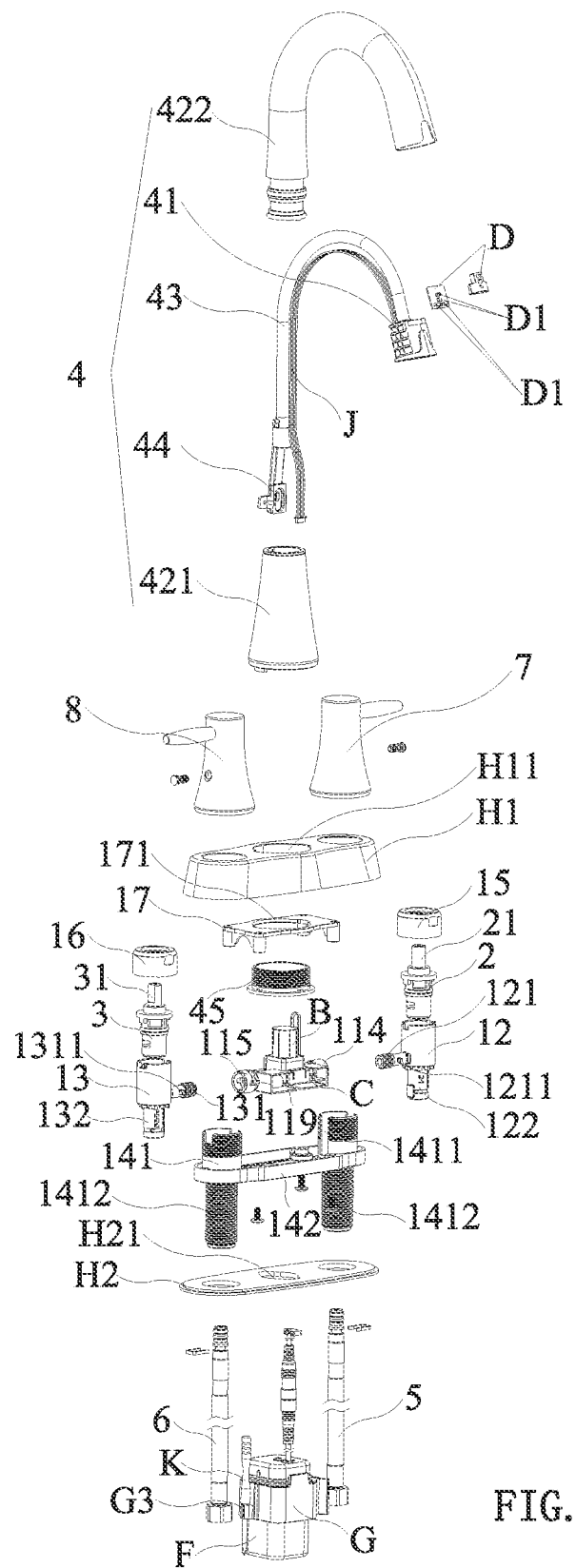
FIG. 4 is a second exploded view of the present invention.
Figure 5:
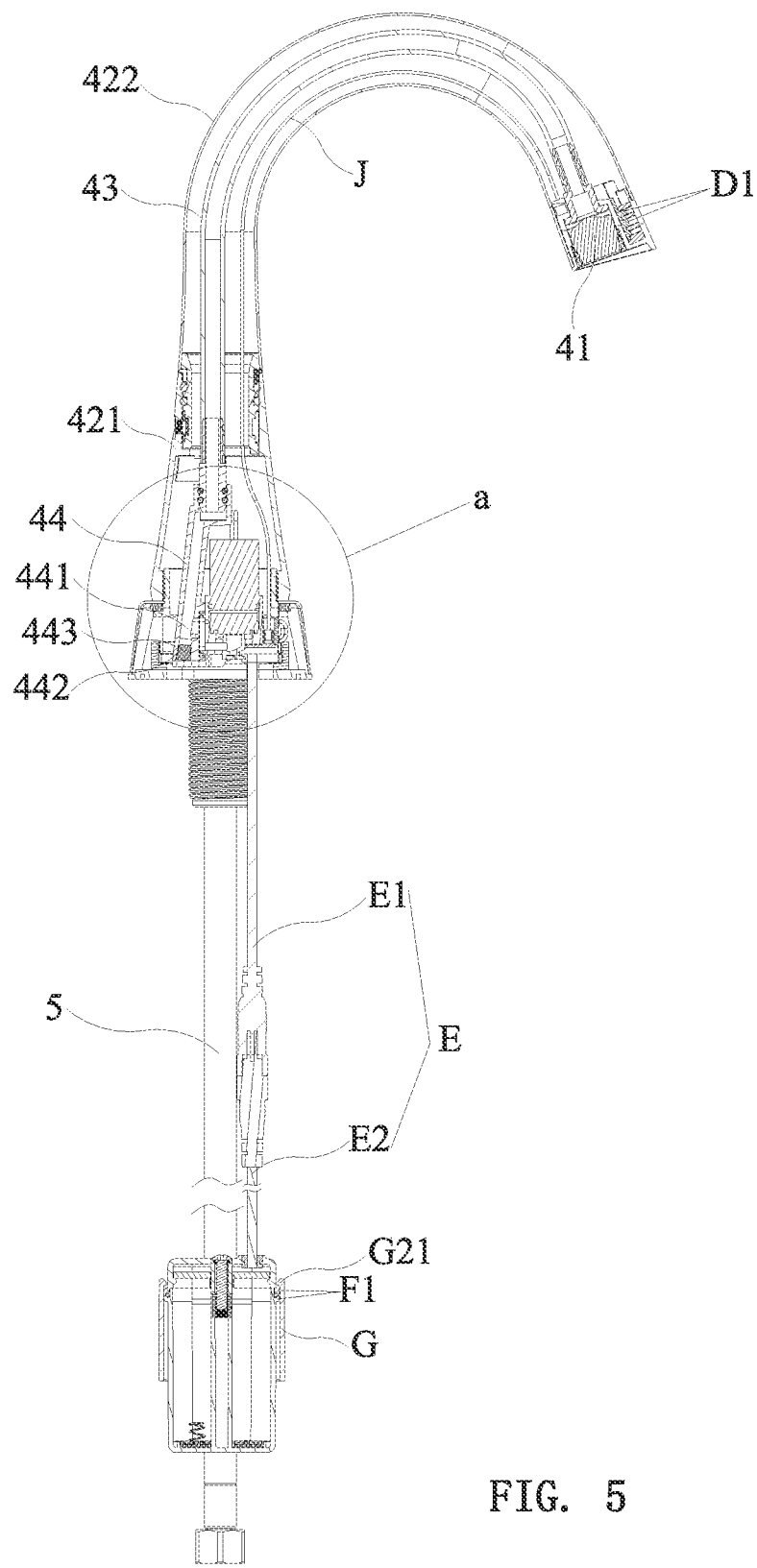
FIG. 5 is a first cross-sectional view of the present invention.
Figure 6:
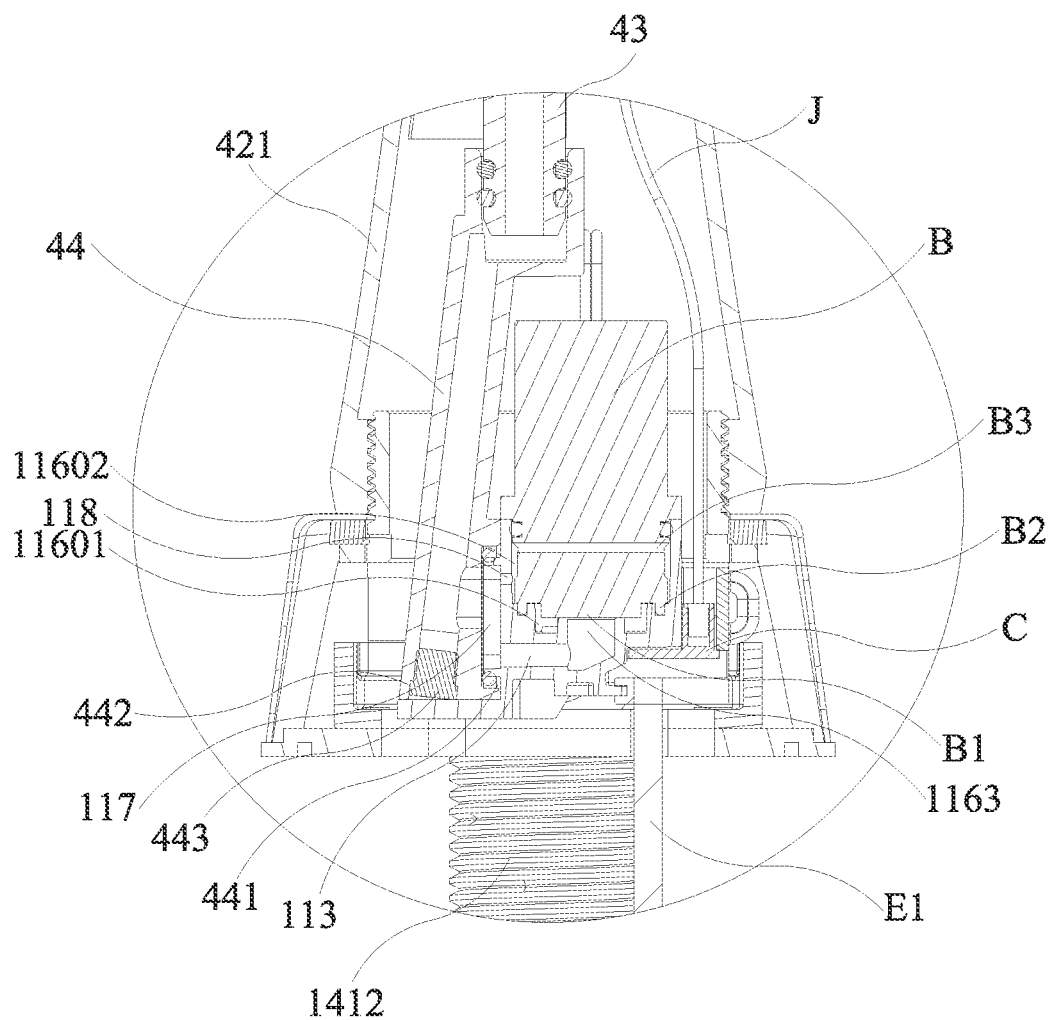
FIG. 6 is an enlarged view of circle a of FIG. 5.
Figure 7:
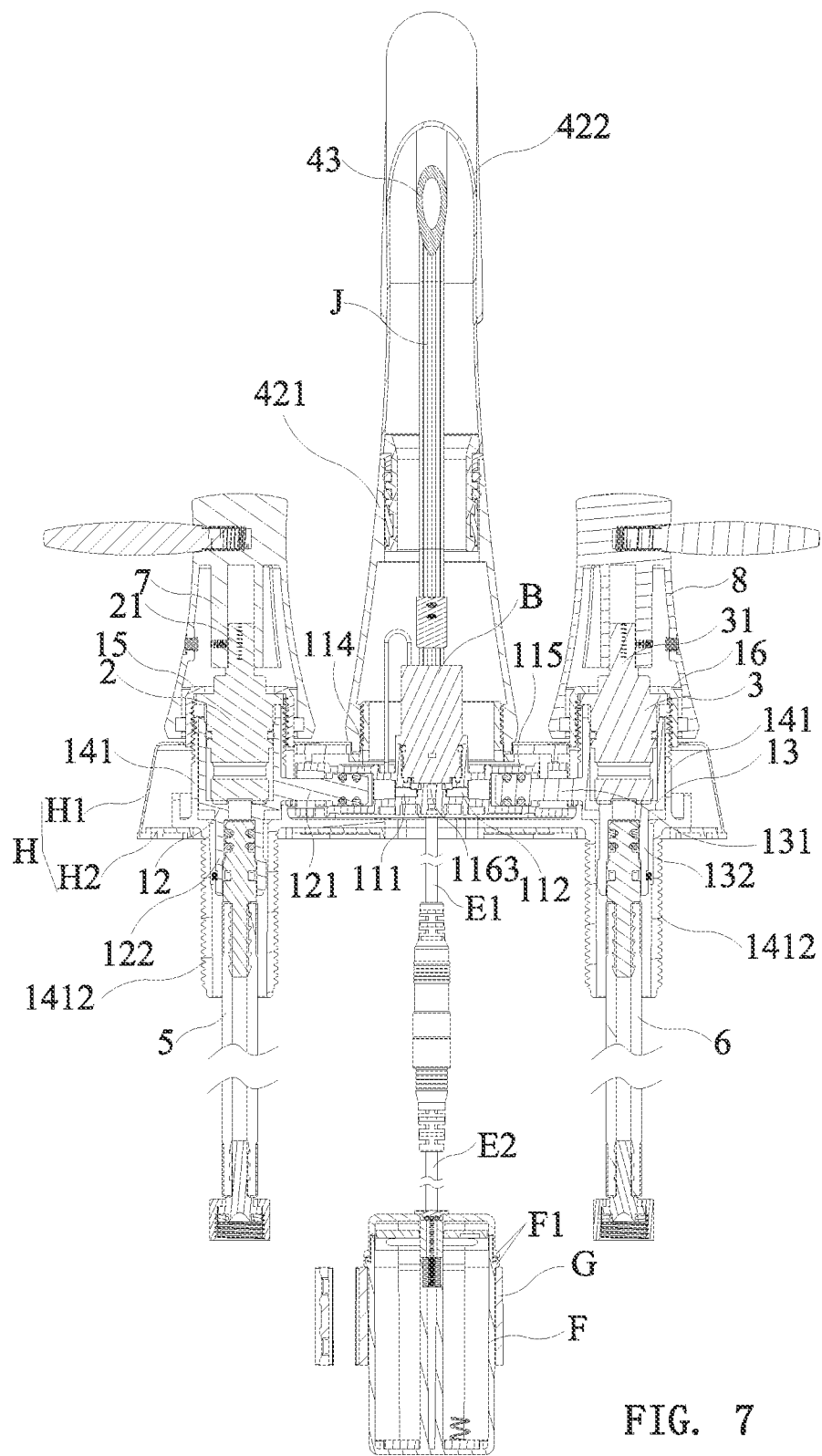
FIG. 7 is a second cross-sectional view of the present invention.
Figure 8:
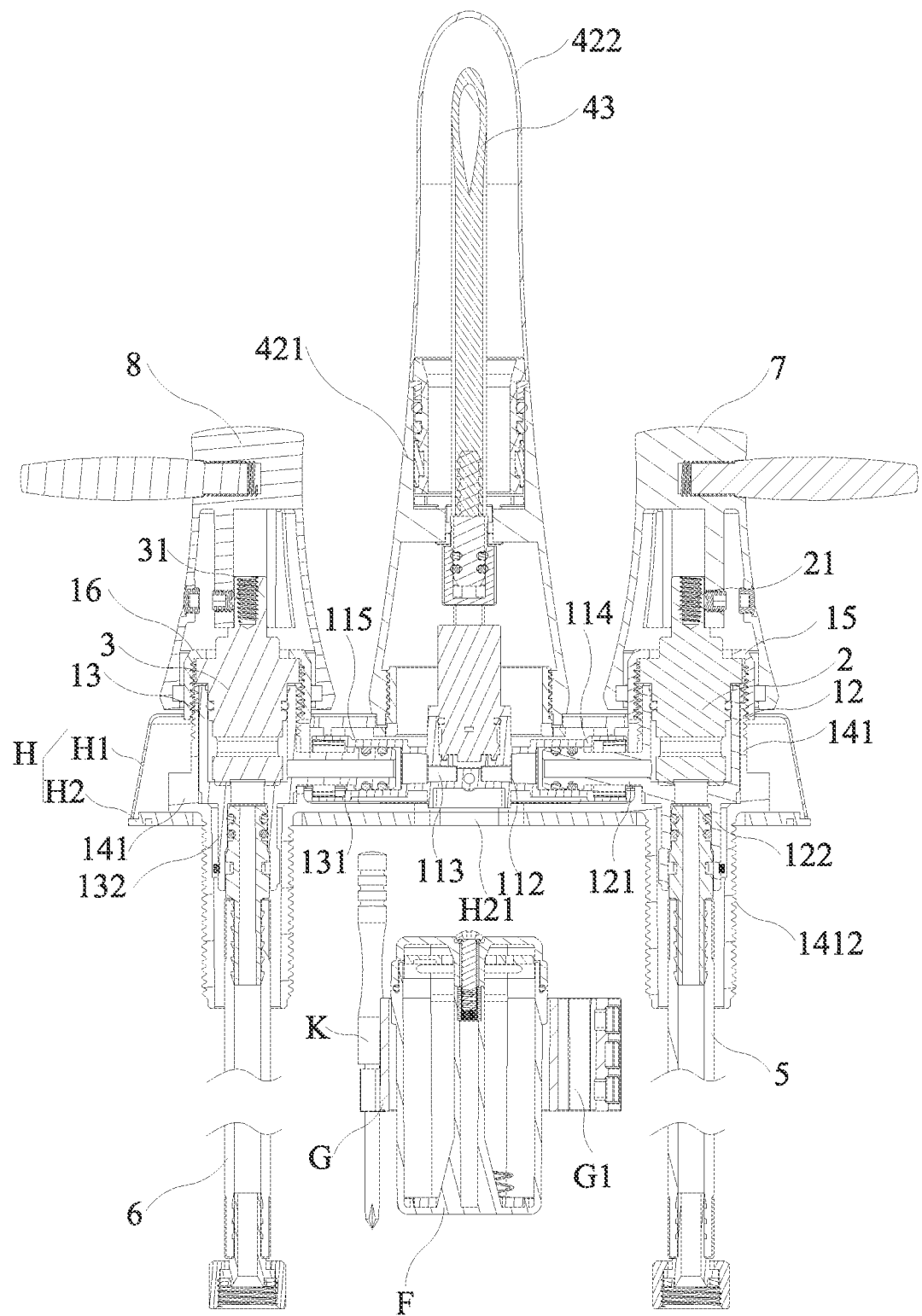
FIG. 8 is a third cross-sectional view of the present invention.

As shown in FIGS. 3 to 8, the solenoid valve B is installed to the base 1. The mounting seat 11 of the base 1 has a water passage 116. The cold water channel 111 and the hot water channel 112 communicate with the water output channel 113 through the water passage 116. The water passage 116 is provided with a cold water inlet 1161, a hot water inlet 1162 and a water outlet 1163 communicating with the cold water channel 111, the hot water channel 112 and the water output channel 113, respectively. The solenoid valve core B is installed to the mounting seat 11 of the base 1. The solenoid valve core B is fixed to the mounting seat 11 by screws. A valve head B1 of the solenoid valve core B extends into the water passage 116. The valve head B1 of the solenoid valve core B movably blocks the water outlet 1163 to control water flowing out of the nozzle 41. As shown in FIG. 6, the solenoid valve core B is provided with a partition B2. The partition B2 extends into the water passage 116 and partitions the inner cavity of the water passage 116 into a water flow chamber 11601 and an air flow chamber 11602. The cold water inlet 1161, the hot water inlet 162 and the water outlet 1163 communicate with the water flow chamber 11601. The valve head B1 of the solenoid valve core B extends into the water flow chamber 11601 and movably blocks the water outlet 1163. The solenoid valve core B has a ventilation channel B3 communicating with the air flow chamber 11602. The air flow chamber 11602 is configured to communicate with the outside air, so that the ventilation channel B2 of the solenoid valve core B is configured for normal air intake and exhaust, and the valve head B1 of the solenoid valve core B can operate normally. The mounting seat 11 has a water output port 117 for connecting the nozzle 41. The water output port 117 is in communication with the water output channel 113, so that the water output channel 113 can deliver water to the nozzle 41. The air flow chamber 11602 communicates with the outside air through an air flow channel 118 in the mounting seat 11 and the water output port 117. If the water in the water flow chamber 11601 flows to the air flow chamber 11602, the water flowing to the air flow chamber 11602 flows to the nozzle 41, thereby avoiding water from overflowing everywhere and causing a damage to the property. The connecting joint 44 of the faucet spout 4 may have a receiving hole 441 for receiving the water output port 117 so that the connecting joint 44 communicates with the water output port 117. The receiving hole 441 is located on the side of the connecting joint 44. The end of the connecting joint 44 is formed with a core-pulling hole 442 to facilitate injection molding of the connecting joint 44. The connecting joint 11 is locked to the mounting seat 11 by screws. The core-pulling hole 442 is blocked by a plug 443 to prevent the core-pulling hole 442 from leaking.

Figure 3:
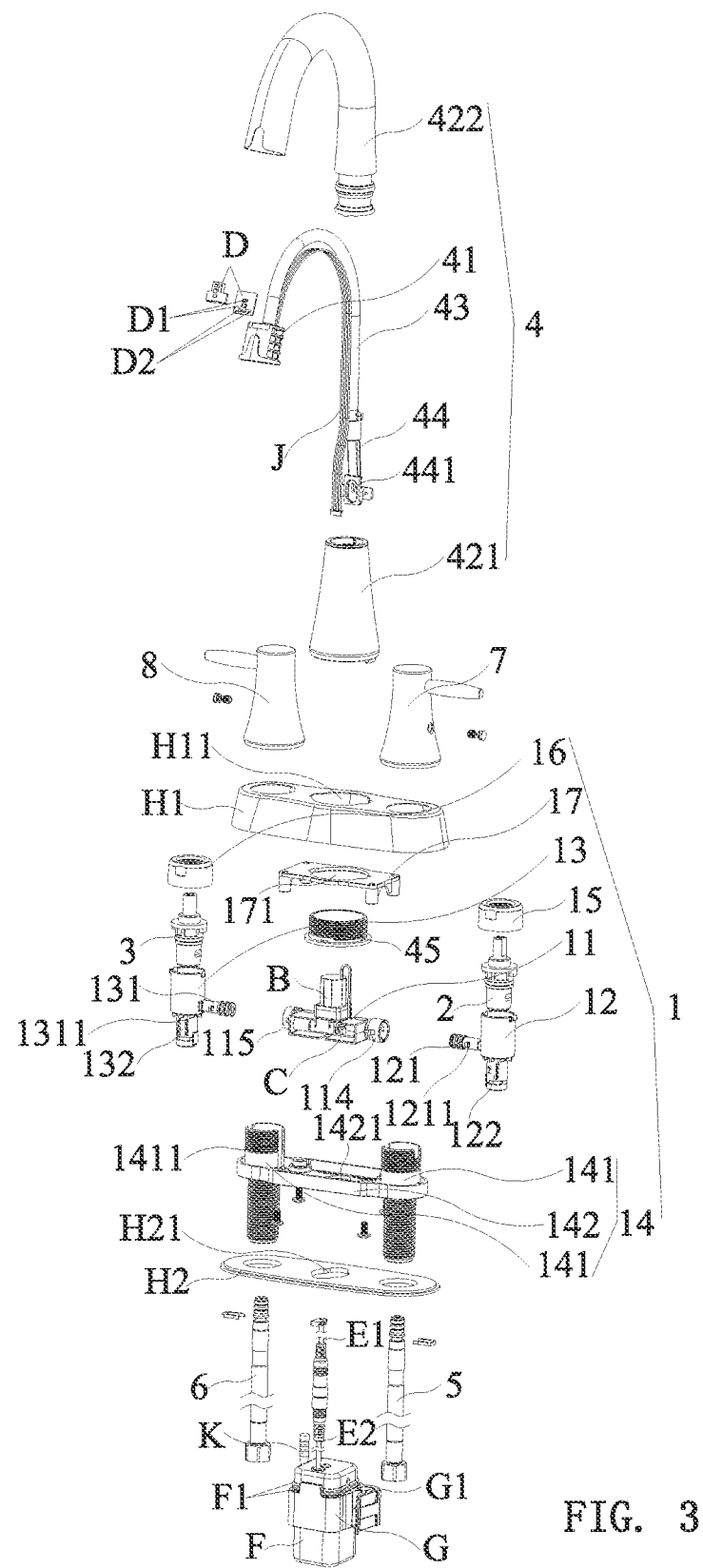
FIG. 3 is a first exploded view of the present invention.
Figure 9:
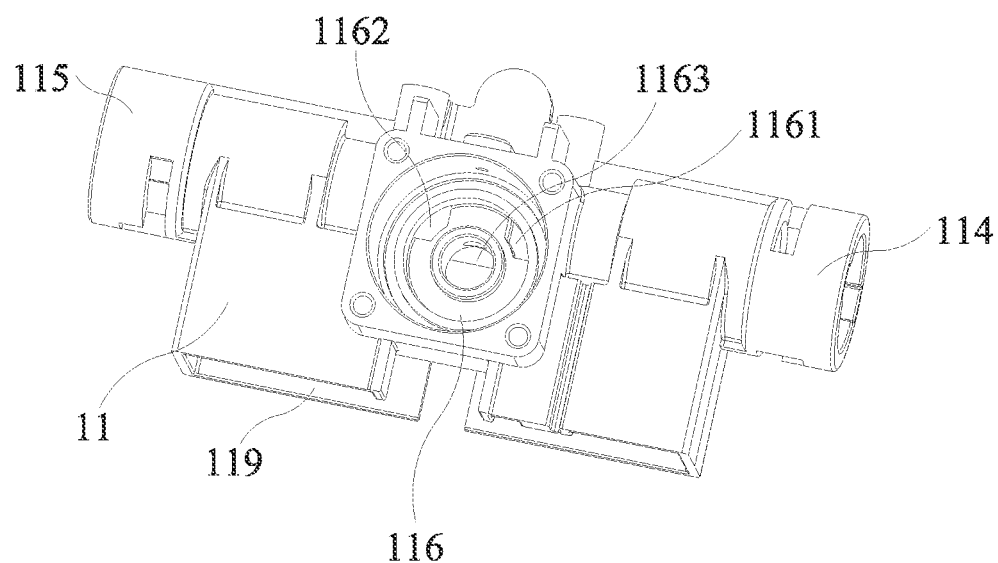
FIG. 9 is a first perspective view of the mounting seat of the present invention.
Figure 10:
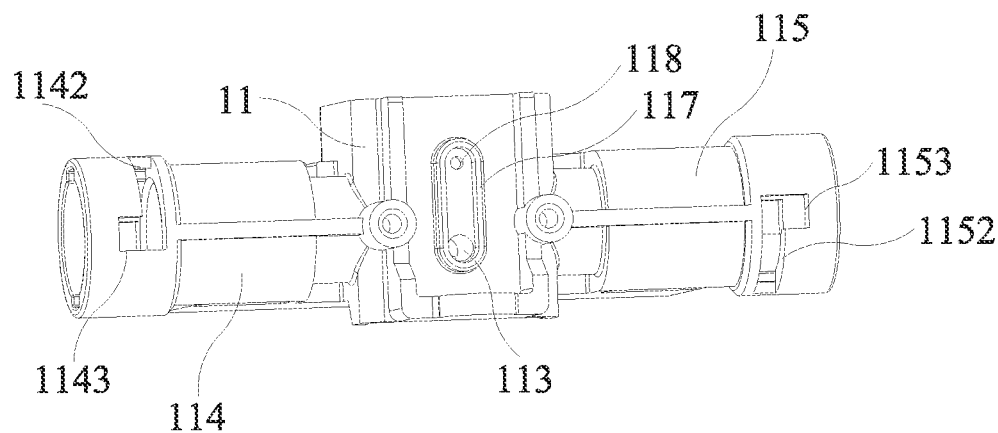
FIG. 10 is a second perspective view of the mounting seat of the present invention.

As shown in FIG. 3, FIG. 4 and FIG. 9, the opening of the water passage 116 of the mounting seat 11 faces upwards. The cold water inlet 1161, the hot water inlet 1162 and the water outlet 1163 are arranged at the bottom of the water passage 116. The solenoid valve core B is installed to the upper portion of the mounting seat 11. The solenoid valve core B can close the opening of the water passage 116 to prevent water leakage. The through hole 171 of the cover plate 17 corresponds in position to the solenoid valve core B to receive the solenoid valve core B. The fixed pipe 421 of the outer pipe 42 sleeves the solenoid valve core B, which is beneficial to reduce the volume of the two-handle automatic faucet of the present invention.

Figure 11:
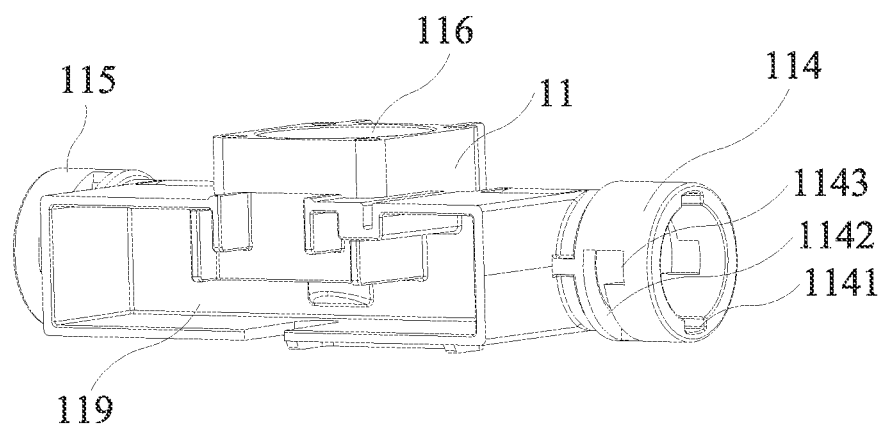
FIG. 11 is a third perspective view of the mounting seat of the present invention.
Figure 12:
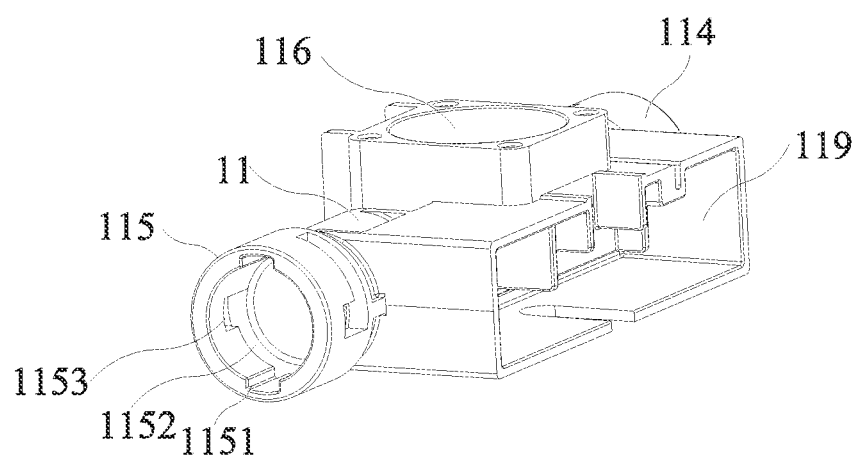
FIG. 12 is a fourth perspective view of the mounting seat of the present invention.
Figure 13:
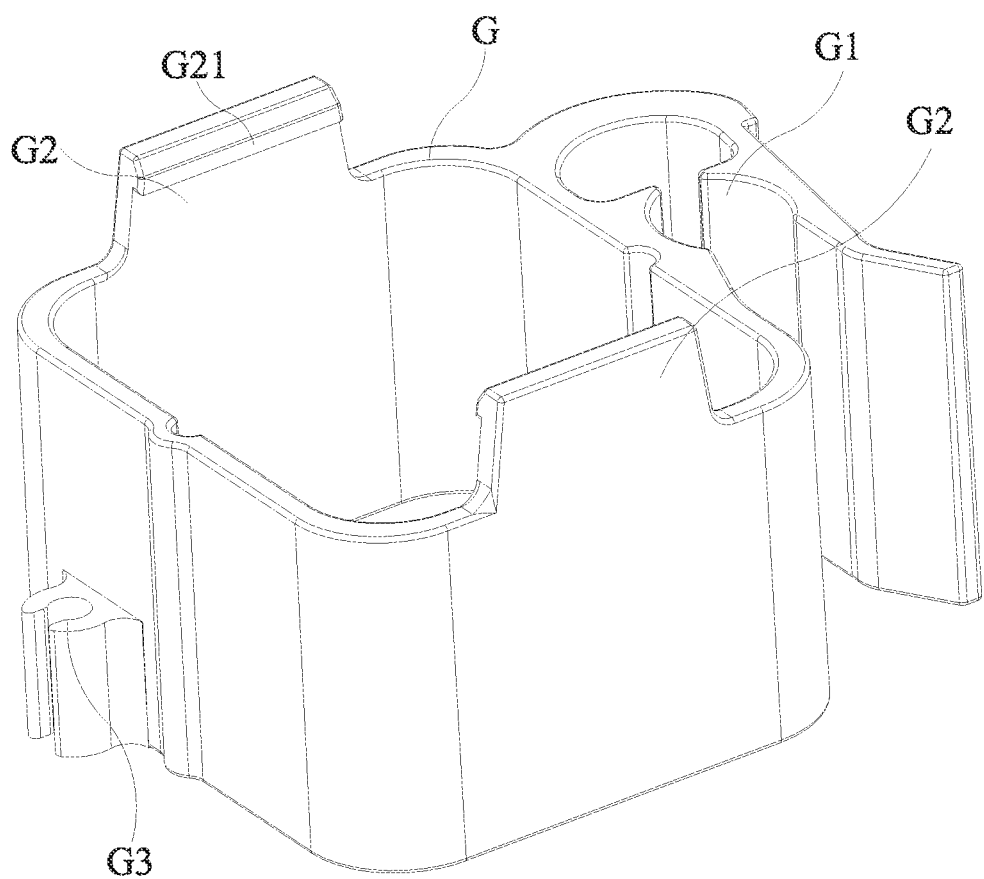
FIG. 13 is a perspective view of the battery holder of the present invention.

As shown in FIG. 3, FIG. 4 and FIG. 11, the controller C is installed to the mounting seat 11 of the base 1. The mounting seat 11 of the base 1 has a mounting groove 119. The controller C is installed in the mounting groove 119. In this way, the controller C and the mounting seat 11 have an overlapped installation space, which is beneficial to reduce the volume of the two-handle automatic faucet of the present invention. The mounting groove 119 may be filled with sealing glue. The sealing glue covers the controller C to protect the controller C. The fixing plate 142 of the fixing seat 14 is formed with a wire hole 1421 for a power wire E to pass therethrough, so that the controller C is connected to a power source through the power wire E. As shown in FIGS. 1 to 4 and FIG. 13, the present invention further includes a power supply battery F. The power supply battery F is electrically connected to the controller C through the power wire E to supply power to the controller C. The power supply battery F is installed to a battery holder G. The battery holder G includes an elastic clamp G1. The elastic clamp G1 is configured to clamp one of the cold water pipe 5 and the hot water pipe 6, so that the battery holder G is secured. In this way, the battery holder G with the elastic clamp G1 can position the power supply battery F easily. The side wall of the power supply battery F may be provided with an annular stop F1. The battery holder G may be provided with at least two elastic pieces G2. The elastic piece G2 is provided with an engaging portion G21 for engaging the upper side of the annular stop F1. The battery holder G also supports the lower side of the annular stop F1, so that the power supply battery F is installed to the battery holder G. The battery holder G may be formed with a slot G3 for insertion of a screwdriver K. In this way, the two-handle automatic faucet of the present invention may be equipped with a screwdriver K on the battery holder G, so that the user can repair the two-handle automatic faucet of the present invention. The power wire E may include a first power wire E1 and a second power wire E2 that are detachably connected. The first power wire E1 and the second power wire E2 are connected to the controller C and the power supply battery F, respectively. This allows the user to replace the power supply battery F, which is convenient for the user to use. It should be noted that the present invention is not limited to supplying power to the controller C through the power supply battery F, and the present invention can also supply power to the controller C through a power adapter.

As shown in FIGS. 1 to 8, the present invention further includes a decorative casing H. The decorative casing H is composed of an upper casing H1 and a lower casing H2. The decorative casing H sleeves the two fixing sleeves 141 of the fixing seat 14. The decorative casing H covers the fixing plate 142 of the fixing seat 14, the mounting seat 11, and the cover plate 17. The decorative casing H is configured to hide the fixing plate 142, the mounting seat 11 and the cover plate 17 to improve the appearance of the two-handle automatic faucet of the present invention and to protect the controller C effectively. The decorative casing H has an upper hole H11 and a lower hole H21 corresponding to the wire hole 1421 of the fixing plate 142 and the fixed pipe 421 of the outer pipe 42, respectively.

As shown in FIG. 3, FIG. 4, and FIG. 5, the sensor D may be installed to the nozzle 41 of the faucet spout 4 to facilitate the sensor D to sense the presence of a user. The sensor D has two sensor probes D1. The sensor probe D1 may be an infrared sensor probe. The sensing direction of one of the sensor probes D1 is along the water jetting direction of the nozzle 41, and the sensing direction of the other sensor probe D1 is along the side of the nozzle 41. In this way, the present invention can realize two control modes for controlling the faucet to jet water in different manners. The sensor probe D1 with the sensing direction along the water jetting direction of the nozzle 41 is used to realize the control mode that when the sensor probe senses the presence of the user, the faucet is immediately turned on; when the sensor probe senses the absence of the user, the faucet is immediately turned off. The other sensor probe D1 with the sensing direction along the side of the nozzle 41 is used to realize the control mode that when the sensor probe senses the presence of the user, the faucet jets water continuously; when the sensor probe senses the presence of the user once again, the faucet stops jetting water. The sensor D is electrically connected to the controller C through a signal wire J. The signal wire J passes through the outer pipe 42 of the faucet spout 4. It should be noted that the sensor D is not limited to be installed to the nozzle 41. The sensor D may be installed to other parts of the faucet body A as long as the sensor D is able to sense the presence of the user. In addition, the number of sensor probes D1 of the sensor D is not limited to two. The number of sensor probes D1 of the sensor D is at least one.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A two-handle automatic faucet, comprising a faucet body, a solenoid valve core, a controller, and a sensor;
   the faucet body including a base, a cold water valve core, a hot water valve core, and a faucet spout, the base having a cold water channel, a hot water channel, and a water output channel communicating with the cold water channel and the hot water channel; the cold water valve core and the hot water valve core being mounted to the base; the faucet spout being matched with the base, the faucet spout having a nozzle communicating with the water output channel;
   the solenoid valve core, the controller and the sensor being installed to the faucet body, the controller being electrically connected to the solenoid valve core and the sensor; the controller controlling action of the solenoid valve core according to a sensor signal of the sensor, so as to correspondingly control water flow of the nozzle of the faucet spout;
   wherein the base includes a mounting seat, a cold water valve seat, and a hot water valve seat; the mounting seat has the cold water channel, the hot water channel and the water output channel, the cold water valve seat and the hot water valve seat are connected to the mounting seat, an inner cavity of the cold water valve seat and an inner cavity of the hot water valve seat communicate with the cold water channel and the hot water channel, respectively; the cold water valve core and the hot water valve core are mounted to the cold water valve seat and the hot water valve seat, respectively;

wherein the mounting seat is provided with a water passage, the cold water channel and the hot water channel communicate with the water output channel through the water passage, the water passage is provided with a cold water inlet, a hot water inlet and a water outlet communicating with the cold water channel, the hot water channel and the water output channel, respectively;

the solenoid valve core is installed to the mounting seat of the base, and a valve head of the solenoid valve core extends into the water passage and movably blocks the water outlet; and wherein the solenoid valve core is provided with a partition, the partition extends into the water passage and partitions an inner cavity of the water passage into a water flow chamber and an air flow chamber; the cold water inlet, the hot water inlet and the water outlet communicate with the water flow chamber; the valve head of the solenoid valve core extends into the water flow chamber, the solenoid valve core has a ventilation channel communicating with the air flow chamber; the mounting seat has a water output port for connecting the nozzle, the water output port is in communication with the water output channel, and the air flow chamber communicates with the water output port through an air flow channel in the mounting seat.

2. The two-handle automatic faucet as claimed in claim 1, wherein the faucet spout includes an outer pipe, an inner pipe and the nozzle, the inner pipe is inserted into the outer pipe, one end of the inner pipe is connected to the nozzle, another end of the inner pipe is connected to a connecting joint; the connecting joint is connected to the mounting seat, and the connecting joint communicates with the water output port.

3. The two-handle automatic faucet as claimed in claim 2, wherein the outer pipe includes a fixed pipe and a movable pipe, one end of the fixed pipe is mounted to the base, and the movable pipe is rotatably connected to another end of the fixed pipe.

4. The two-handle automatic faucet as claimed in claim 1, wherein the mounting seat of the base has a mounting groove, and the controller is installed in the mounting groove.

5. The two-handle automatic faucet as claimed in claim 1, wherein the base further includes a fixing seat, the fixing seat includes two fixing sleeves and a fixing plate connected to the two fixing sleeves, the two fixing sleeves of the fixing seat are sleeved onto the cold water valve seat and the hot water valve seat respectively, and the fixing plate of the fixing seat supports the mounting seat.

6. The two-handle automatic faucet as claimed in claim 1, wherein the sensor is installed to the nozzle; the sensor has two sensor probes, a sensing direction of one of the sensor probes is along a water jetting direction of the nozzle, and a sensing direction of the other sensor probe is along a side of the nozzle.

7. The two-handle automatic faucet as claimed in claim 1, further comprising a power supply battery electrically connected to the controller, the power supply battery being installed to a battery holder, the battery holder including an elastic clamp.

8. The two-handle automatic faucet as claimed in claim 7, wherein the battery holder has a slot.

* * * * *